United States Patent [19]

Vasta, deceased, et al.

[11] Patent Number: 5,008,322

[45] Date of Patent: Apr. 16, 1991

[54] HYDROPHOBIC POLYMER PRODUCTS

[76] Inventors: Joseph A. Vasta, deceased, late of Wilmington; by Rita Vasta, executrix, 1412 Jan Dr., Webster Farms, Wilmington, both of Del. 19803

[21] Appl. No.: 288,911

[22] Filed: Dec. 23, 1988

[51] Int. Cl.$^5$ ............................ C08K 5/04; C08K 5/06
[52] U.S. Cl. .................................... 524/398; 524/435; 524/762; 524/857; 524/556; 524/578; 526/108; 526/135
[58] Field of Search ............... 526/108, 135; 524/398, 524/857, 762

[56] References Cited

U.S. PATENT DOCUMENTS

| | | | |
|---|---|---|---|
| 3,125,559 | 3/1964 | Shokal et al. | 526/108 |
| 3,242,121 | 3/1966 | Hill, Jr. | 524/833 |
| 3,262,919 | 7/1966 | Bolgiano | 260/80.5 |
| 3,413,250 | 11/1968 | Varron et al. | 260/23 |
| 3,477,862 | 11/1969 | Forsyth | 106/22 |
| 3,513,120 | 5/1970 | Pohlemann et al. | 260/29.6 |
| 3,625,715 | 12/1971 | Nasca | 106/2 |
| 3,661,619 | 5/1972 | Surland | 117/62.2 |
| 3,741,922 | 6/1973 | Glemaski et al. | 260/17 A |
| 3,878,139 | 4/1975 | Takahashi et al. | 260/17 A |
| 3,887,513 | 6/1975 | Fritze et al. | 260/33.6 |
| 3,983,059 | 9/1976 | Sekmakas | 524/762 |
| 4,014,833 | 3/1977 | Story | 260/29.2 |
| 4,173,554 | 11/1979 | Sulzberg | 525/407 |
| 4,177,076 | 12/1979 | Sato | 106/32 |
| 4,210,565 | 7/1980 | Emmons | 524/567 |
| 4,260,531 | 4/1981 | Wachtel et al. | 260/29.6 |
| 4,267,091 | 5/1981 | Geelhaar et al. | 260/29.6 |
| 4,273,833 | 6/1981 | De Long | 524/398 |
| 4,289,678 | 9/1981 | Calder et al. | 260/33.6 |
| 4,327,011 | 4/1982 | Ripley et al. | 524/474 |
| 4,334,878 | 6/1982 | Cutler et al. | 524/88 |
| 4,415,683 | 11/1983 | Kernstock | 524/43 |
| 4,460,727 | 7/1984 | Shoji | 524/215 |
| 4,471,079 | 9/1984 | Enami | 523/161 |
| 4,472,537 | 9/1984 | Johnson et al. | 523/160 |
| 4,567,213 | 1/1986 | Bhatia et al. | 523/160 |
| 4,648,905 | 3/1987 | Peck et al. | 106/24 |
| 4,680,332 | 7/1987 | Hair et al. | 524/377 |

*Primary Examiner*—Joseph L. Schofer
*Assistant Examiner*—Mark Sweet
*Attorney, Agent, or Firm*—Hilmar L. Fricke

[57] ABSTRACT

Polymeric products of styrene, an acrylate, acrylic or methacrylic acid and polyethylene oxide, prepared in contact with a cobalt compound, are hydrophobic and can be used as rheology control agents in printing ink.

9 Claims, No Drawings

HYDROPHOBIC POLYMER PRODUCTS

TECHNICAL FIELD

This invention relates to a new class of polymeric products containing cobalt. It is more particularly directed to the polymeric products obtained by polymerizing styrene, an acrylate, acrylic or methacrylic acid and polyethylene oxide in contact with a cobalt compound, and to inks containing the products as rheology control agents.

BACKGROUND AND SUMMARY OF THE INVENTION

Ethyl hydroxyethylcellulose is commonly used as an additive for printing ink. This cellulose ester not only extends the ink but also provides rheological control at printing viscosities and gives an ink whose print has enhanced abrasion resistance. It is, however, quite expensive and tends to degrade the gloss of print.

It has now been found that blending such a cellulose ester with a polymeric product of the invention not only provides a less expensive additive without loss of abrasion resistance, but also gives an ink whose print has improved gloss and enhanced color intensity, especially at the red end of the spectrum.

In addition, the polymeric product of the invention, when laid down as a film on a substrate, demonstrates dramatic hydrophobicity, which makes it useful as a water-repellant coating for glass and metal wherever such things are employed.

DETAILED DESCRIPTION OF THE INVENTION

The polymeric products of the invention can be made by bringing the following components together, under conditions suitable for polymerization:

(1) Styrene, at a concentration of 50–85%, preferably 55–70%, most preferably about 63%, by weight of the total charge.

(2) 2-ethylhexyl acrylate, 2-ethylhexyl methacrylate or butyl acrylate, at a concentration of 10–40%, preferably 20–35%, most preferably about 30%.

(3) Acrylic or methacrylic acid, at a concentration of 2–10%, preferably 4–8%, most preferably about 5%.

(4) Polyethylene oxide, at a concentration of 0.5–10%, preferably 1–5%, most preferably about 2%. The polyethylene oxide should have a molecular weight $M_n$ of 20,000–400,000, preferably 100,000–300,000. Such a product is commercially available.

(5) A cobalt compound, at a concentration of 10–150 ppm, preferably 25–75 ppm, most preferably about 50 ppm. This compound can be any which provides $Co+2$ or $Co+3$ ions and is soluble in the system, but is preferably a product sold by Manchem Incorporated of Princeton NJ as Manosec Cobalt 18. This product is proprietary and its composition is therefore unknown to the public, but it is believed to be a cobalt-boron soap modified with C8–C13 fatty acids.

To prepare a polymer product of the invention, one takes an appropriate amount of cobalt compound, as a solution in toluene or another suitable organic liquid, and mixes it with (A) the desired amount of polyethylene oxide and (B) an inert organic liquid such as xylene, and then brings the mixture to reflux temperature. To this mixture is then added a mixture of (1), (2) and (3), as described above, together with an appropriate amount of a conventional polymerization initiator such as ditertiary butyl peroxide The resulting mixture is held at reflux temperature until polymerization is substantially complete, as determined by conventional viscosity measurements.

The resulting mass, a solution of polymer product in the organic liquid, can be concentrated by evaporation or can be laid down on a substrate and dried to give a hydrophobic film.

To use the polymer product of the invention as an ink additive, it is mixed with a cellulose ester, preferably ethyl hyroxyethylcellulose, in product/ester weight ratios of 20–80/8020, preferably about 50/50, to give a concentrate. This concentrate can then be added to conventional ink at a concentration of 0.5–4% by weight, preferably about 2%, as needed.

EXAMPLE

Those skilled in the art will be able to practice this invention more easily after referring to the following illustrative example.

These artisans will no doubt be able to compose numerous variations on the theme disclosed, such as changing the amounts of components slightly but insignificantly from those shown, adding innocuous substances, or substituting equivalent or nearly equivalent components for those shown. All such variations are considered to be within the inventive concept.

In the Example, all parts are by weight.

A mixture was prepared to contain

| | |
|---|---|
| Xylene | 1190.00 parts |
| Manosec 18 (10% in toluene) | 5.01 parts |
| Polyethylene oxide MW = 300,00 | 36.00 parts |

This mixture was heated to reflux temperature and held there, with stirring, while the following mixture was added over a four-hour period:

| | |
|---|---|
| Styrene | 1134.00 parts |
| 2-ethylhexyl acrylate | 540.00 parts |
| Acrylic acid | 90.00 parts |
| Ditertiary butyl peroxide | 52.92 parts |

To the resulting mixture was then added a mixture of

| | |
|---|---|
| t.butyl peroxyacetate | 18.00 parts |
| Xylene | 10.00 parts |

The reaction mass was then held at reflux temperature, with stirring, for two hours, to give the polymer product styrene/2-ethylhexyl acrylate/acrylic Acid/polyethylene oxide, 63/30/5/2, which was a clear light tan solution, 59.5% solids, with a Gardner-Holdt viscosity of Z-4.

This solution was diluted to a concentration of 10% with toluene, and was then mixed in equal proportions with a 10% solution of ethyl hydroxyethyl cellulose (Hercules HE 350), to give a concentrate.

Forty parts of this concentrate was then mixed with 160 parts of ink (R1909-148, General Printing Ink Division, Sun Chemical Corp.) and the product drawn on a glass plate and dried. The resulting film was glossy and not readily wettable with water.

It is claimed:

1. A polymeric product obtained by bringing together, in an organic liquid, in contact with an appropriate polymerization initiator and under conditions suitable for polymerization,
   (a) styrene,
   (b) 2-ethylhexyl acrylate, 2-ethyl hexyl methacrylate or butyl acrylate,
   (c) acrylic acid or methacrylic acid,
   (d) polyethylene oxide having a molecular weight $M_n$ of 20,000–400,000 and
   (e) a cobalt compound which provides $Co^{+2}$ or $Co^{+3}$ ions.

2. The product of claim 1 wherein (e) is a cobalt-boron soap modified with C8-C13 fatty acids.

3. The product of claim 1 or 2 wherein (b) is 2-ethylhexyl acrylate and (c) is acrylic acid.

4. The product of claim 1 or 2 wherein (a) constitutes 2–10%, (d) constitutes 0.5–10%, and (e) constitutes 25–75 ppm, all by weight of the total charge.

5. The product of claim 1 or 2 wherein (a) constitutes 55–70%, (b) constitutes 20–35%, (c) constitutes 4–8%, (d) constitutes 1–5% and (e) constitutes 25–75 ppm, all by weight of the total charge.

6. The product of claim 1 or 2 wherein (a) constitutes about 63%, (b) constitutes about 30%, (c) constitutes about 5%, (d) constitutes about 2%, and (e) constitutes about 50 ppm, all by weight of the total charge.

7. The product of claim 3 wherein (a) constitutes 50–85%, (b) constitutes 10–40%, (c) constitutes 2–10%, (d) constitutes 0.5–10%, and (e) constitutes 25–75 ppm, all by weight of the total charge.

8. The product of claim 3 wherein (a) constitutes 55–70%, (b) constitutes 20–35%, (c) constitutes 4–8%, (d) constitutes 1–5%, and (e) constitutes 25–75 ppm, all by weight of the total charge.

9. The product of claim 3 wherein (a) constitutes about 63%, (b) constitutes about 30%, (c) constitutes about 5%, (d) constitutes about 2%, and (e) constitutes about 50 ppm, all by weight of the total charge.

* * * * *

UNITED STATES PATENT AND TRADEMARK OFFICE
CERTIFICATE OF CORRECTION

PATENT NO.   : 5,008,322

DATED        : April 16, 1991

INVENTOR(S)  : Joseph A. Vasta

It is certified that error appears in the above-identified patent and that said Letters Patent is hereby corrected as shown below:

Col. 4, lines 1-3 should read as follows:

--4. The product of claim 1, or 2 wherein (a) constitutes 50-85%, (b) constitutes 10-40%, (c) constitutes 2-10%, (d) constitutes 0.5-10%, and (e) constitutes 25-75 ppm, all by weight of the total charge--.

Signed and Sealed this

Seventeenth Day of November, 1992

Attest:

DOUGLAS B. COMER

*Attesting Officer*     Acting Commissioner of Patents and Trademarks